(12) United States Patent
Schmidt et al.

(10) Patent No.: US 6,588,830 B1
(45) Date of Patent: Jul. 8, 2003

(54) ENERGY ABSORBING FRAME RAIL TIP

(75) Inventors: Robert W Schmidt, Livonia, MI (US); Nagappan Sekkappan, W. Bloomfield, MI (US); James V Legray, Lake Orion, MI (US); Forest Nine, Bloomfield Hills, MI (US); Ralph L Beaufait, Columbus, MI (US); Seung-Jae Song, Novi, MI (US); Kezia Pratima, Southfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/187,656

(22) Filed: Jul. 1, 2002

(51) Int. Cl.[7] .............................................. B62D 21/15
(52) U.S. Cl. ........................ 296/189; 296/194; 296/205; 296/203.02; 296/204; 280/784; 280/791; 180/311
(58) Field of Search ................................ 296/187, 188, 296/189, 194, 203.01, 204, 205, 203.02; 280/784, 791; 180/311

(56) References Cited

U.S. PATENT DOCUMENTS

| | | | |
|---|---|---|---|
| 4,413,856 A | 11/1983 | McMahan et al. | |
| 4,684,151 A * | 8/1987 | Drewek | 296/189 |
| 4,702,515 A * | 10/1987 | Kato et al. | 296/189 |
| 4,929,008 A | 5/1990 | Esfandiary | |
| 4,976,481 A | 12/1990 | Yoshihira | |
| 5,172,948 A | 12/1992 | Garnweidner | |
| 5,868,457 A * | 2/1999 | Kitagawa | 296/188 |
| 5,913,565 A * | 6/1999 | Watanabe | 296/189 |
| 5,941,582 A | 8/1999 | Tan | |
| 6,050,624 A | 4/2000 | Kim | |
| 6,068,329 A | 5/2000 | Miller | |
| 6,068,330 A | 5/2000 | Kasuga et al. | |
| 6,174,008 B1 | 1/2001 | Kramer et al. | |
| 6,250,711 B1 | 6/2001 | Takahara | |
| 6,302,476 B1 | 10/2001 | Larsson et al. | |
| 6,308,809 B1 | 10/2001 | Reid et al. | |
| 6,312,028 B1 | 11/2001 | Wilkosz | |
| 6,325,431 B1 | 12/2001 | Ito | |
| 6,371,541 B1 | 4/2002 | Pedersen | |
| 6,406,088 B1 * | 6/2002 | Tate | 296/189 |
| 6,439,650 B2 * | 8/2002 | Artner et al. | 293/102 |
| 6,474,709 B2 * | 11/2002 | Artner | 293/133 |

* cited by examiner

*Primary Examiner*—D. Glenn Dayoan
*Assistant Examiner*—H. Gutman
(74) *Attorney, Agent, or Firm*—Donald J. Wallace

(57) ABSTRACT

A tapered octagonal frame rail tip for use with automotive bumpers is configured to axially crush in a controlled manner in the event of a vehicle impact. The rail tip is tuned to carry a constant load while crushing to absorb a higher amount of energy than alternative crush modes. Body mounts for attaching front end sheet metal or other body components to the frame rail tip are configured to centrally align loading to avoid interference with the desired axial crush.

10 Claims, 2 Drawing Sheets

ENERGY ABSORBING FRAME RAIL TIP

FIELD OF THE INVENTION

The present invention relates to automotive crash absorbing components and more particularly to structural members that connect the bumper to an automotive frame tuned to control energy absorption.

BACKGROUND OF THE INVENTION

A variety of energy absorbing components have been used in mounting automotive bumpers. Some components incorporate springs, shear pins, hydraulic fluids and gels and explosive charges which react to compressive loads to dissipate energy. While these energy absorbing devices have performed adequately, they are often bulky and incapable of absorbing the energy of an impact in a controlled, stabilized fashion. Other devices utilize sacrificial structural components that are designed to collapse under the loading of a vehicle collision. Most of these devices are lighter and more cost effective than springs or other reusable devices. Some sacrificial structural components utilize a tubular structure that has a generally constant cross-section. Convolutions or holes are incorporated into the tubular devices to encourage a controlled collapse.

One objective of a controlled dynamic crushing mode for these devices is to prevent a plastic hinging and bending of the device. In a bending mode, the device can fold, allowing the bumper to approach the frame with relatively little energy absorption. In this type of undesired bending mode, residual energy is translated to the frame of the vehicle resulting in a higher loading on the vehicle and its passengers.

Another objective is to control the impact energy in as constant a fashion as possible to limit potential high impact loading on the vehicle. Convolutions can sustain the crush sequence in a desired bumper to frame direction to provide for maximum energy absorption. Out-of-sequence crushing results in less energy absorption by the device and can promote an undesired plastic hinge bending. Traditionally, rail tip designs have had rectangular cross-sections with the axis of maximum moment of inertia aligned with a horizontal Y axis. Under normal vehicle operating conditions, bending about axes parallel to the Y axis is a predominant concern. Rectangular cross-sections also provide large flat surfaces ideal for bracketry and body mount attachments. The rectangular cross-section, however, is not an ideal design for dynamic loading because it's resistance to bending is essentially unilateral. During axial crush, it is susceptible to inboard or outboard bending about the axis of minimum moment of inertia.

SUMMARY OF THE INVENTION

In the present invention, a rail tip is provided which interconnects the automotive frame and bumper. The rail tip absorbs kinetic energy during impact by crushing sequentially bumper to frame in a natural mode without reliance upon convolutions and/or holes to sustain the crush sequence. The design utilizes stability theory and empirically developed data to offer greater reliability, higher energy absorbing efficiency and greater stability against plastic hinging and bending. The rail tip of the present invention is tuned by careful selection of the octagonal circumference, wall thickness, length wise taper and material properties to crush under a design load and absorb a predetermined amount of kinetic energy over the crushable length. The octagonal-shaped rail tip is hydro formed from a cylindrical tube rather than constructed in the traditional method of two halves stamped, overlapped and welded. Fabricated in this manner, it is less likely to have flaws in form, fit and welding that could adversely affect axial crush and induce plastic hinge bending or out of sequence folding during crush. The octagonal cross-section shape tapers from a perimeter approximately 13 inches at the bumper end to approximately 15 inches at the frame end to better resist side loads during crushing. The wall thickness also tapers to maintain an advantageous ratio of wall thickness to perimeter. Together these tapers promote sequential bumper to frame axial crush. A buckling initiator can also be provided to reduce the peak buckling load while initiating bumper to frame crush. The front end sheet metal body mount attaches through the center line of the rail tip rather than hanging from one side. This reduces the magnitude of side loading introduced by the body into the mid-rail tip during crush.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

Figure 1:
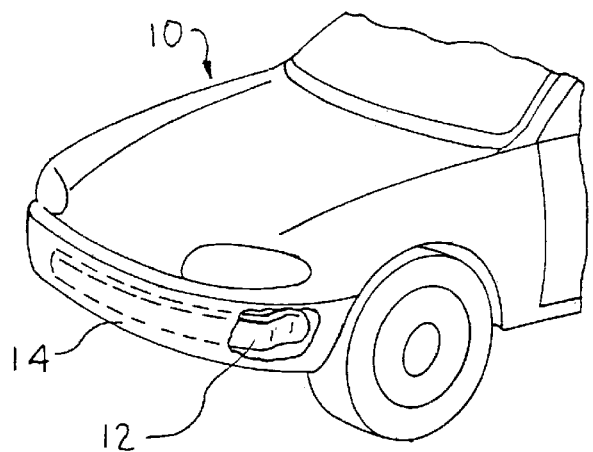
FIG. 1 is a perspective view of the front end of an automobile
Figure 2:
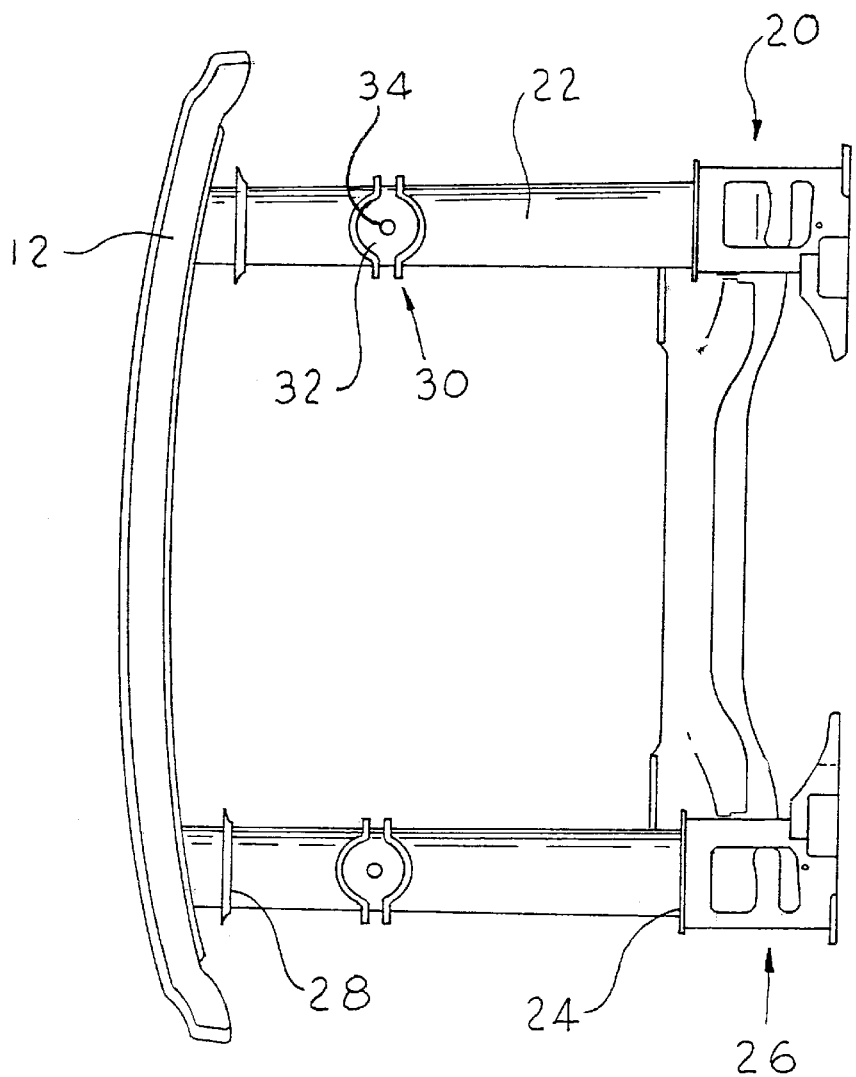
FIG. 2 is a plan view of the rail tips of the present invention shown interconnecting the frame and bumper of the automobile of FIG. 1.

Referring to FIG. 1, an automobile 10 is partially shown with bumper 12 visible through a cut-out in bumper cover 14. FIG. 2 shows rail tip assembly 20 which includes rail tips 22 connected at a first end 24 to frame 26. A second end 28 of rail tips 22 are connected to bumper 12. In a preferred embodiment, the perimeter of first end 24 is attached to frame 26 via a continuous weld. In this manner impact loading on rail tip 22 will not distort the shape of the perimeter of first end 24 prior to dynamic crushing of rail tip 22.

Rail tip 22 is preferably provided with a body mount 30. Body mount 30 includes bracket 32 and pin 34. Front end sheet metal or other components are attached to body mount 30. Pin 34 preferably intersects the center line of rail tip 22 while connecting through rail tip 22. In this manner, dynamic loading on body mount 30 will result in a lower bending moment on rail tip 22.

Figure 3:
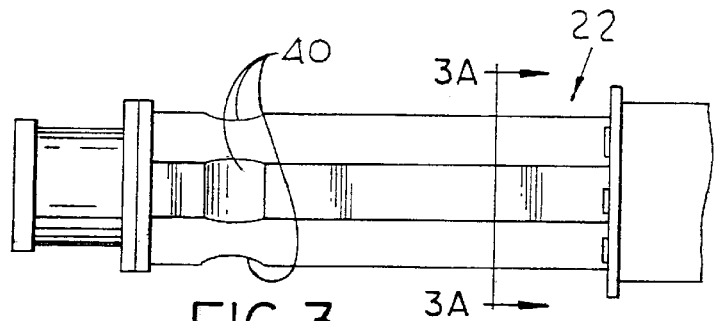
FIG. 3 is a side view of the rail tip of the present invention.

With continuing reference to FIG. 3, rail tip 22 is preferably provided with buckling initiators 40. Buckling initiators 40 promote the axial crush of rail tips 22 in the event of a collision by providing a weakened area for the axial crush to initiate. While FIG. 3 depicts buckling initiators as indentions in the surface of rail tip 22, it should be understood that any equivalent tube strength weakening portion, such as a raised portion is equivalent.

Figure 3A:
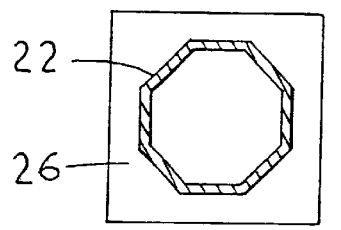
FIG. 3A is a sectional view of the rail tip taken along the line 3A in FIG. 3.
Figure 3B:
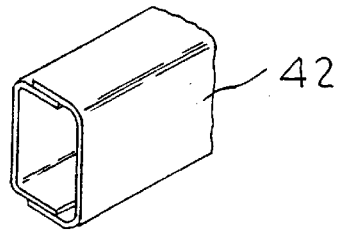
FIG. 3B is a perspective view of a prior art rail tip.
Figure 4:
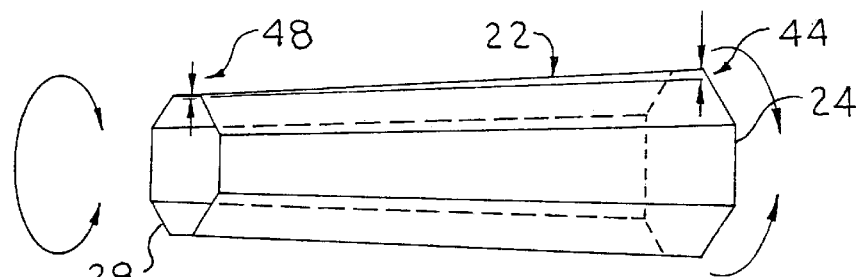
FIG. 4 is a perspective view of a rail tip of the present invention.

FIGS. 3A and 4 depict the preferred octagonal perimeter cross-section of rail tip 22. FIG. 3B shows a prior art rectangular cross-section welded rail tip 42.

With reference to FIG. 4, rail tip 22 is shown in a preferred embodiment having a tapered configuration wherein the perimeter of first end 24 is greater than the perimeter of second end 28. Rail tip 22 first tube thickness 44 is greater than second tube thickness 48. Preferably, the ratio of tube thickness to perimeter remains generally constant along the length of rail tip 22. In this manner, rail tip 22 is encouraged or tuned to buckle from the second end 28 nearest bumper 12 to the first end 24 nearest frame 26 during a dynamic axial crush. Axial crush of rail tips 22 from bumper 12 to frame 26 during impact loading will be minimally affected by loading on body mount 30.

Figure 5:
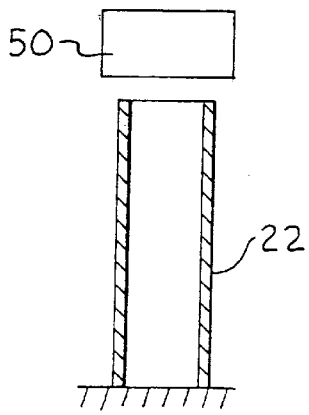
FIG. 5 is a sectional view of a rail tip shown in the crush test position.
Figure 6:
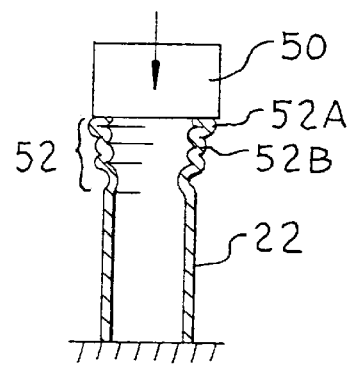
FIG. 6 is a sectional view of a rail tip of the present invention shown in the axial crush mode.
Figure 7:
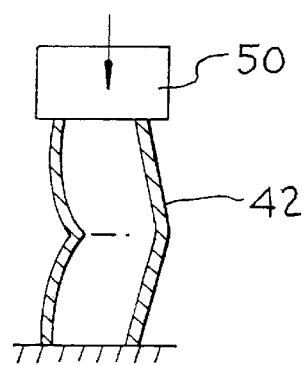
FIG. 7 is a sectional view of a prior art rail tip shown in a plastic hinge bending mode.

With reference to FIG. 5, a rail tip 22 is shown in test position with test ram 50. As shown in FIG. 6, when test ram 50 impacts with sufficient force, an octagonal rail tip 22 crushes sequentially due to plastic deformation of successive half-waves 52 are formed. The first half-wave 52A is formed when a portion of rail tip 22 displaces radially as rail tip 22 shortens longitudinally. This axially symmetric half-wave flattens out and the growth of a second half-wave 52B is promoted. FIG. 7 depicts a prior art rectangular rail tip 42 in plastic hinge bending subsequent to impact by test ram 50. When axial crushing of a tube in this manner is controlled, the tube thickness and perimeter can be selected to maintain a generally constant dynamic loading. Maintaining a constant load while absorbing a greater amount of impact energy will lower the peak loading experienced by the frame and passengers of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A frame rail tip comprising a tubular member adapted at a first end for attachment to an automobile;

said member further configured to axially crush when a force is applied to a second end;

said tubular member being tapered with the perimeter of said first end being greater than the perimeter of said second end; and said tubular member having a wall thickness that varies along an axial length of the tubular member, wherein said wall thickness of said tubular member is tapered along the axial length of said tubular member such that the ratio of said wall thickness to said perimeter is generally constant.

2. A rail tip comprising a tubular member having a first end and a second end, the first end being adapted to attach to an automobile frame, the tubular member configured to axially crush when a force is applied to the second end, wherein:

the tubular member is tapered such that a first end circumference is greater than a second end circumference; and the tubular member has a perimetric wall having a thickness, wherein the thickness varies as a function of a corresponding circumference of the tubular member.

3. The rail tip of claim 2, wherein the thickness of the perimetric wall varies such that the ratio of the thickness to the corresponding circumference is generally constant.

4. The rail tip of claim 2, wherein the tubular member is formed using a one-piece construction.

5. The rail tip of claim 2, wherein a cross-section of the tubular member describes a polygon having more than four sides.

6. The rail tip of claim 2, further comprising a radially displaced portion of the perimetric wall, the radially displaced portion adapted to promote axial buckling of the tubular member when the force is applied to the second end.

7. The rail tip of claim 6, wherein the displaced portion is located near the second end.

8. The rail tip of claim 2, second end is adapted for attachment to a bumper.

9. The rail tip of claim 2, further comprising a body mount passing through a center line of the tubular member.

10. The rail tip of claim 9, wherein the body mount is adapted for attachment to body components.

* * * * *